No. 854,641.  
PATENTED MAY 21, 1907.  
T. HALEY.  
CONTROLLING NOZZLE FOR HOSE AND HOSE PIPE.  
APPLICATION FILED MAR. 27, 1906.

Witnesses.  
P. W. Pezzetti  
E. Batchelder

Inventor  
Thomas Haley  
by Wright Brown Quinby May  
Attys.

UNITED STATES PATENT OFFICE.

THOMAS HALEY, OF BOSTON, MASSACHUSETTS.

CONTROLLING-NOZZLE FOR HOSE AND HOSE-PIPE.

No. 854,641.　　　　　Specification of Letters Patent.　　　　　Patented May 21, 1907.

Application filed March 27, 1906. Serial No. 308,235.

*To all whom it may concern:*

Be it known that I, THOMAS HALEY, of Boston, in the county of Suffolk and State of Massachusetts, have invented certain new and useful Improvements in Controlling-Nozzles for Hose and Hose-Pipes, of which the following is a specification.

This invention relates to a hose nozzle adapted to discharge a solid stream of water, the said means comprising an elongated gradually tapered cone, occupying the axial center of the nozzle, and affixed thereto, and a sleeve adjustably mounted in the nozzle, and movable toward and from the base of the cone, the latter constituting a seat upon which the inner end of the sleeve is adapted to bear, for the purpose of fully shutting off the flow of water from the nozzle, the movement of the sleeve toward the said seat contracting the flow, while the movement of the sleeve away from the seat increases the flow.

In Letters Patent of the United States No. 654,891, I have shown a hose nozzle of the character above indicated.

My present invention has for its object to provide certain improvements in hose nozzles of this character looking to increased efficiency, durability and convenience of operation, and to this end the invention consists in the improvements which I will now proceed to describe and claim.

Figure 1:
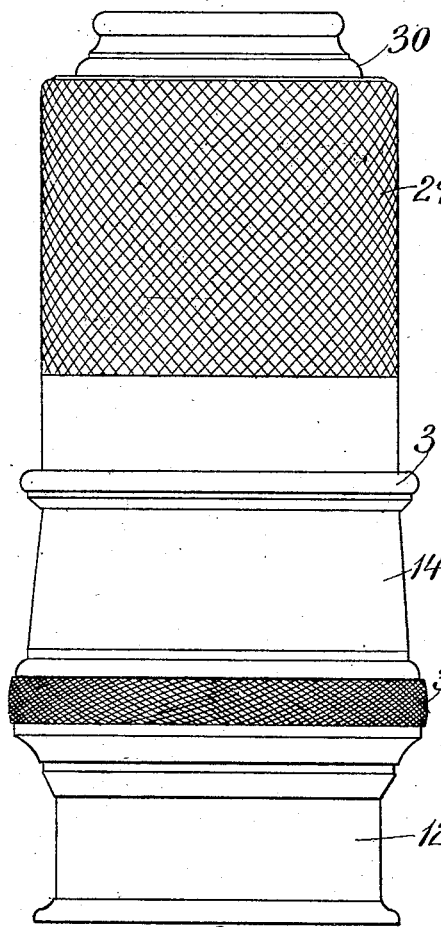
Figure 2:
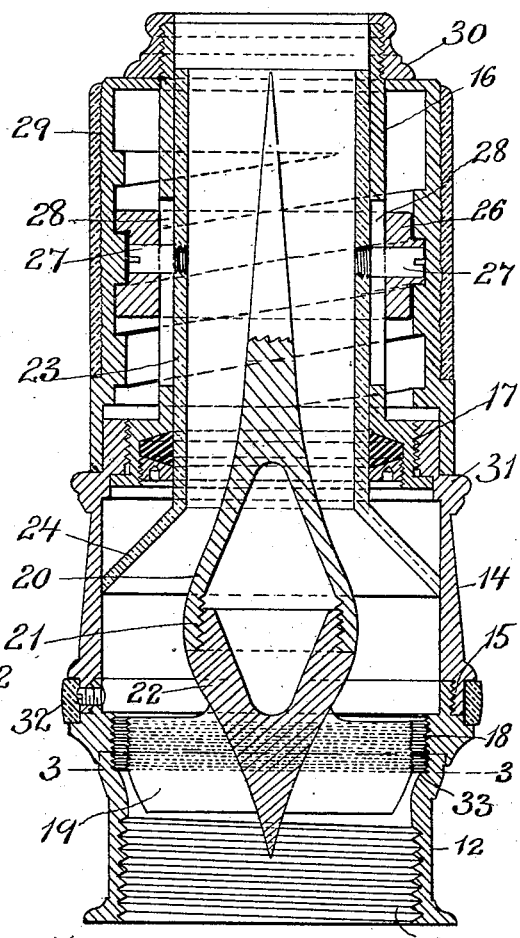
Figure 4:
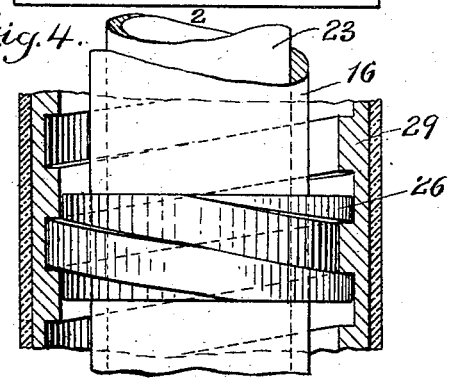
Figure 3:
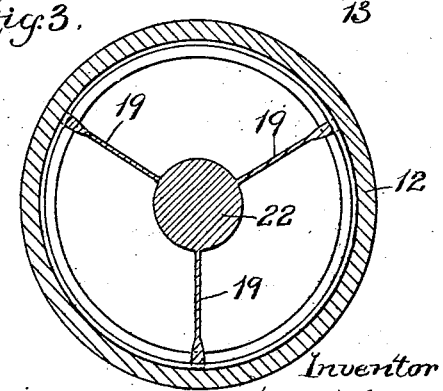

Of the accompanying drawings, forming a part of this specification,—Figure 1 represents a side elevation of a hose nozzle embodying my invention. Fig. 2 represents a section on line 2—2 of Fig. 1. Fig. 3 represents a section on line 3—3 of Fig. 2. Fig. 4 represents a fragmentary view partly in section and partly in elevation, showing certain parts represented in Fig. 2.

The same letters of reference indicate the same parts in all the figures.

The body portion of my improved nozzle comprises a base section 12, which is internally threaded at 13 to engage a threaded terminal on a hose, a middle section 14 having a screw-thread connection at 15 with the base section, and an outer section 16 having a screw-thread connection at 17 with the middle section, the outer section being contracted or reduced in diameter. The base section has an internal screw thread 18, with which are engaged the outer ends of arms or wings 19, radiating from the base portion of a cone 20, which projects from the base section, through the middle section, and into the outer section, the axis of the cone being at the longitudinal center of the body of the nozzle.

The outer ends of the arms 19 are provided with segments of a screw thread, adapted to engage the internal thread 18, so that the cone may be applied by rotating it in one direction to cause the engagement of the outer ends of the arms with the screw thread, and disengaged by rotating it in the opposite direction, to detach the outer ends of the arms from the screw thread. The arms 19 are very thin, and are preferably sharpened at their edges so that they present a minimum obstruction to the flow of water through the nozzle. It will be seen that provision is thus made for detachably connecting the cone with the body of the nozzle by the simple operation of screwing it to place.

The base section 12 is provided with a shoulder 33, against which the arms abut when they have been screwed to the proper position. This provision for securing the cone in place enables the cone to be entirely finished before its application to the nozzle, and obviates the necessity of any finishing work after the cone has been inserted. After the cone is finished, it is firmly secured to the base section with its arms 19 bearing on the shoulder 33, and then the intermediate or middle section and the outer section are secured in place. If it becomes necessary to take the nozzle apart to gain access to the cone, the outer and middle sections can be readily removed so as to leave the cone supported by the base section with its surface accessible along practically its entire length. In the cone, shown in the prior patent above mentioned, the arms which support the cone were cast with the base section, the base portion of the cone being, therefore, inseparably connected with the base section of the nozzle, so that after the base section and the base portion of the cone have been cast, a considerable amount of work is required in finishing the arms and the corresponding portion of the base section, this work having to be done within the base section, and, therefore, at a disadvantage. The cone 20 is composed of two parts or sections which are united by a screw thread connection at 21. The inner section 22 is the one on which the arms 19 are formed this section being tapered toward the receiving end of the nozzle. The outer section has a much longer and more gradual taper, and points toward the delivering end of the nozzle, its apex being near the outer end of the nozzle, as shown in Fig. 2.

23 represents a sleeve which is fitted to slide in the outer section 16, and constitutes the outlet portion of the nozzle. The sleeve 23 is longitudinally movable in the outer section 16 by means hereinafter described, the extent of its movement being such that its inner end is adapted to be seated upon the base portion of the cone section 20, thus shutting off the flow of water through the nozzle, the internal diameter of the sleeve 23 being less than the greatest diameter of the base portion of the cone 20. It will be seen, therefore, that the flow of water through the nozzle may be regulated by adjusting the inner end of the sleeve 23 at different distances from its seat on the base of the cone. The inner end of the sleeve 23 has a flaring mouth 24, the outer edge of which has a sliding fit on the interior of the middle section 14, the said flaring mouth guiding the water that enters the nozzle, into the contracted sleeve 23. The water flowing through said sleeve emerges in a solid stream from its outer end, the size of the stream being determined by the adjustment of the sleeve.

The means for adjusting the sleeve are as follows: 26 represents a collar having an abrupt external screw thread, and attached to the sleeve 23 by means of screws 27, passing through longitudinal slots 28 in the outer section 16.

29 represents an internally threaded sleeve or nut which is rotatable upon the nozzle, its internal thread engaging the thread of the collar 26. The nut 29 is prevented from moving endwise by means of a retaining flange 30, screwed upon the outer end of the outer section 16, the nut 29 being confined between the flange 30 and a shoulder or projection 31 on the middle section 14. The nut 29 is preferably externally milled, or otherwise formed, to afford a hand grip so that it may be readily rotated to adjust the collar 26 and with the latter the sleeve 23.

32 represents a ring of rubber or other elastic material inserted in a groove formed between the sections 12 and 14, the said ring constituting a buffer to prevent injury to the nozzle when it is dropped upon a hard surface. The middle section 14 is of larger diameter, both internally and externally, than the base and outlet sections. The base portion of the cone is within the middle section, and the internal enlargement of said section increases the capacity of the nozzle, and permits the discharge of a stream equal to the maximum outlet capacity of the nozzle when the sleeve 23 is at the outer extreme of its adjustment.

I claim:

1. A hose nozzle comprising a body composed of three sections removably connected together, a cone removably connected with the base section and projecting therefrom through the middle section, and a longitudinally adjustable sleeve co-operating with said cone to regulate the flow of water.

2. A hose nozzle comprising a body composed of three separable sections, a cone having radial arms or wings near one end, the said arms and the base section of the body having complemental means for detachably connecting the arms to said section, the other end of the cone extending into the top section of the body, and a longitudinally adjustable sleeve extending from the top section into the middle section and co-operating with said cone to regulate the flow of water.

3. A hose nozzle comprising a body composed of three separable sections, the base section having an internal screw thread, and a cone having radial arms or wings provided at their outer ends with segments of an external screw thread adapted to engage said internal thread, said cone being supported by said arms and projecting into the outlet end of the nozzle.

4. A hose nozzle comprising a body composed of a base section, a middle section and an outer section, the middle section being internally enlarged, a cone fixedly secured to the base section and projecting therefrom into the outer section, the base of the cone being surrounded by the enlarged middle section, an outlet sleeve slidable in the outer section toward and from the base of the cone, and means for adjusting the said outlet sleeve.

In testimony whereof I have affixed my signature, in presence of two witnesses.

THOMAS HALEY.

Witnesses:
C. F. BROWN,
E. BATCHELDER.